United States Patent

Ruth et al.

[11] Patent Number: 5,918,715
[45] Date of Patent: Jul. 6, 1999

[54] OVERRUNNING PLANAR CLUTCH ASSEMBLY

[75] Inventors: Stephen M. Ruth; Brian D. Klecker, both of Chesterfield, Va.

[73] Assignee: Means Industries, Inc., Saginaw, Mich.

[21] Appl. No.: 08/871,192

[22] Filed: Jun. 9, 1997

[51] Int. Cl.⁶ .................................................. F16D 41/12
[52] U.S. Cl. ............................................ 192/46; 192/69.1
[58] Field of Search ........................... 192/46, 45.1, 69.1; 188/82.74, 82.77, 82.7

[56] References Cited

U.S. PATENT DOCUMENTS

| | | | |
|---|---|---|---|
| 2,710,504 | 6/1955 | Dodge | 192/41 R X |
| 4,049,099 | 9/1977 | Zeigler | 192/46 |
| 4,527,671 | 7/1985 | Ozaki | 188/82.74 |
| 5,070,978 | 12/1991 | Pires | 192/45.1 |
| 5,449,057 | 9/1995 | Frank | 192/69.1 X |
| 5,597,057 | 1/1997 | Ruth et al. | 192/46 |
| 5,605,211 | 2/1997 | Hall | 192/69.1 X |
| 5,690,202 | 11/1997 | Myers | 192/46 |

*Primary Examiner*—Rodney H. Bonck
*Attorney, Agent, or Firm*—Brooks & Kushman P.C.

[57] ABSTRACT

A planar coupling having a first coupling plate connected drivably to a torque input member and a second coupling plate connected to a torque output member, the first coupling plate being mounted for rotation relative to the second coupling plate, the first plate having angularly spaced recesses at uniform radial distances from the axis of the assembly, the second coupling plate having cooperating recesses in which are positioned force transmitting struts that are biased in an axial direction relative to the axis of the assembly so that upon relative rotation of the coupling plates, the struts in the second coupling plate will engage the recesses in the first coupling plate, the geometry of the struts providing for simplified manufacture and for reduced stresses in the struts as they engage the coupling plate recesses.

7 Claims, 4 Drawing Sheets

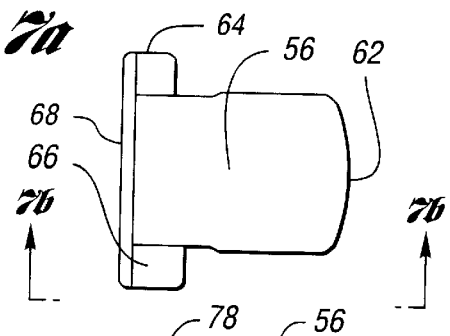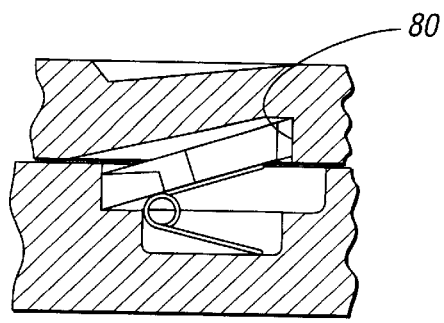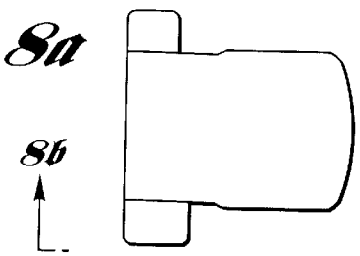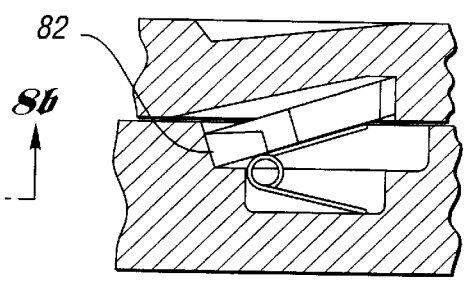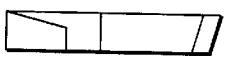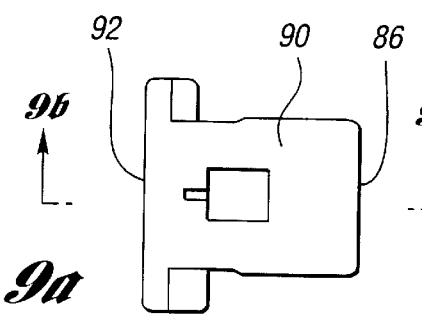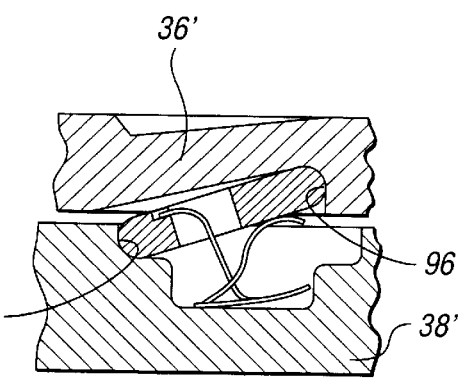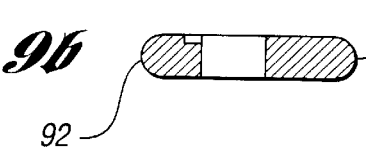

OVERRUNNING PLANAR CLUTCH ASSEMBLY

TECHNICAL FIELD

The invention relates to torque transmitting couplings and, more particularly, to a one-way coupling apparatus having planar coupling members.

BACKGROUND OF THE INVENTION

It is common practice in the management of torque distribution in a power transmission mechanism to employ over-running couplings, acting alone or in combination with a friction coupling, for the purpose of establishing and disestablishing torque transfer from one torque transfer member to another or for anchoring a torque transfer member to a stationary housing, thereby providing a reaction point as torque is delivered from a torque input member to a driven member. In the case of a geared power transmission mechanism, for example, plural torque delivery paths are established for transfer of torque from a source of torque, such as an internal combustion engine, to a driven member such as a torque output shaft connected to a driving axle for a wheeled vehicle.

Such over-running couplings may include concentric inner and outer clutch or brake races with tiltable sprag elements disposed within the races for torque transfer from one race to the other when torque is delivered in one direction through the mechanism. Upon a torque reversal, the sprag elements will permit free-wheeling motion of one race with respect to the other. Another common overrunning coupling assembly comprises concentric inner and outer races, one of the races being cammed. Coupling rollers are disposed between the races, each roller engaging a separate cam surface. Upon torque distribution in one direction through the coupling, the rollers engage the cam surfaces; but upon a torque reversal, the rollers are allowed to disengage their respective cam surfaces as relative over-running motion of the races is permitted.

An objective of the invention is to provide an over-running coupling assembly that does not require precision machining operations that would be inherent in the manufacture of conventional sprag-type couplings or over-running roller coupling assemblies. Planar coupling plates are described in co-pending patent application Ser. No. 08/382,070, filed Feb. 1, 1995 and now U.S. Pat. No. 5,597,057. Reference may be made to that pending patent application for the purpose of supplementing our present invention disclosure. The co-pending application is assigned to the assignee of our present invention.

It is a further objective of the invention to avoid high stress and wear problems that might be associated with prior art planar disk-type clutches such as those disclosed in U.S. Pat. No. 5,070,978 wherein a drive plate and a driven plate of a planar clutch assembly are disposed in closely-spaced, juxtaposed relationship and adapted for rotation about a common axis, one plate being connected to a driving shaft and the other being connected to a driven shaft. A plurality of pockets or recesses is formed in the one clutch plate at angularly spaced locations that are positioned at a predetermined radius from the axis. Corresponding pockets or recesses are formed in the other clutch plate, each pocket thereof having disposed therein a pawl or strut adapted for tilting movement. One edge of each pawl is adapted to register with a pocket formed on the one clutch plate, thereby causing the torque input member to drive the torque output member in a driving direction. If the direction of relative rotation of the clutch plates is reversed, the pawls will disengage the pockets in the one plate thereby allowing free-wheeling motion of the driving member with respect to the driven member. Means may be provided for normally urging each pawl individually into locking engagement with a pocket formed in the one clutch plate.

As described in the co-pending patent application, it is desirable to prevent floating of the individual struts. They are pivotally mounted in the strut pockets in which the struts are received so that the individual struts will be prevented from floating when one clutch plate rotates relative to the other at relatively high relative speeds. Such a floating condition may induce premature wear of the strut and the clutch plates, particularly in those instances when it is undesirable or impractical to lubricate the juxtaposed faces of the clutch plates with a large quantity of lubricating oil during operation.

The struts of a design such as that described in the co-pending application include ear portions that are received in the strut pockets, and provision is made for establishing a pivoting action of each strut one margin. The stresses that are induced in the struts that transfer torque from the driving member to the driven member, however, can be extreme, particularly where tolerance variations between the struts and the cooperating pockets of the driven plate are such that a greater load is carried by one strut relative to a companion strut.

It is desirable further for the struts to be capable of being displaced radially inward under the influence of a hydrodynamic boundary layer, during free-wheeling operation of the clutch. The boundary layer establishes a hydrodynamic bearing that prevents ratcheting action of the struts as the latter traverse the pockets of the driven member during relative overrunning motion of the coupling plates.

SUMMARY OF THE INVENTION

The invention includes driving and driven coupling plates arranged on a common axis, each plate having a coupling face. Strut recesses are formed in each coupling face at angularly spaced locations about the common axis. Struts are received in the recesses in one coupling plate, one edge of the struts engaging recesses in the other coupling plate. Each strut edge has a curvature that substantially matches the curvature of the registering wall of the other coupling plate so that loads are distributed over a load bearing surface to reduce stress during torque transfer between the coupling plates.

The improvements of the invention make it possible to simplify the manufacturing steps that are necessary in forming the clutch plates, their respective pockets, and the torque-transmitting struts. This simplification in the manufacture is achieved regardless of whether the pockets and the struts are formed using powder metallurgy techniques, or whether the elements of the clutch assembly are formed using conventional machining techniques.

The invention also may include multiple active struts to effect an increased torque transmitting capacity of the coupling.

In one embodiment of the improvement of the invention, each strut is formed with a strategic tip radius at an end opposite the end on which the strut is pivoted in its respective pockets. Further, each pocket in the driven member that receives a strut is formed with a concave strut-engaging wall with a radius of curvature equal to or slightly greater than the radius of curvature of the tip of the cooperating strut. This strategic geometric relationship of the strut with respect to the pockets makes it possible to distribute forces on the strut over an increased area, thereby reducing stress on the torque-transmitting elements. The reduced stress is achieved also in a second embodiment of the invention by forming each strut with non-parallel leading and trailing edges and by providing corresponding non-parallel strut-engaging surfaces in the pockets within which the struts are received. This geometry of the struts has the further advantage of simplifying the manufacture of the struts.

The improved design further facilitates the development of a hydrodynamic boundary layer in the lubrication oil. It establishes a hydrodynamic bearing effect as the struts are tilted about one edge so that they disengage the cooperating pocket of the driven member during the free-wheeling mode.

The pockets or recesses in the plates of a preferred embodiment of the invention are angularly spaced about the axis of the coupling so that at least two struts will be active and capable of transmitting torque. The two struts that are received in and pivoted in their respective pockets or recesses in one plate will be received simultaneously in a pocket or recess in the other plate. This distributes the torque transmitting load over at least two active struts. The number of pockets or recesses in the plate may be varied, as desired, depending upon the number of strut engagements that are required for a particular application.

BRIEF DESCRIPTION OF THE DRAWINGS

FIG. 7a shows a plan view of a strut that forms an element of the improved coupling structure;

FIG. 7b is a side elevation view of the strut shown in FIG. 7a;

FIG 7c is a cross-sectional view as seen from the plane of section line 7c—7c of FIG. 7a;

FIGS. 8a, 8b and 8c are views of an alternate strut construction that may be used in lieu of the strut construction shown respectively in FIGS. 7a, 7b and 7c;

FIGS. 9a, 9b and 9c show an alternate strut design that may be used in lieu of the strut designs shown respectively in FIGS. 7a, 7b and 7c;

PARTICULAR DESCRIPTION OF THE INVENTION

Figures 1, 2:
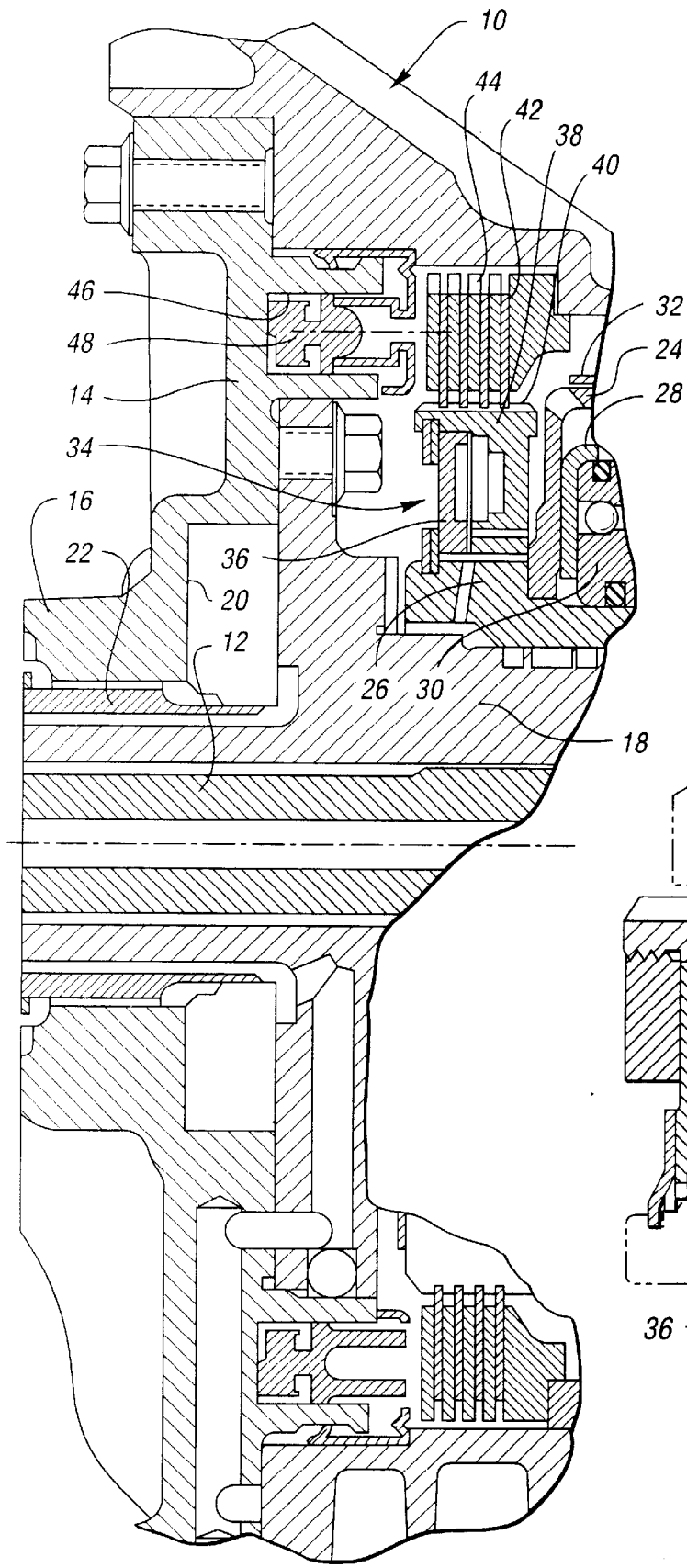
FIG. 1 shows a structural environment in the form of a power transmission mechanism having torque delivery elements in which relative motion between the elements is controlled by the improved coupling.
FIG. 2 is a cross-sectional view taken on a radial plane that contains the axis of the transmission elements of FIG. 1 wherein the clutch structure itself is illustrated in enlarged form.

FIG. 1 shows a power transmission housing 10 for a multiple ratio power transmission mechanism for an engine powered vehicle. A torque input shaft, which may be connected to the driven shaft of a hydrokinetic torque converter, is shown at 12. The impeller of the hydrokinetic torque converter is connected to the crankshaft of an internal combustion engine through a suitable damper mechanism.

A stationary forward support wall 14 supports a torque converter stator shaft 16 and a sleeve shaft 18 for rotatably journalling a clutch and brake assembly for the transmission. The support wall has a pump cavity 20 which encloses the positive displacement pump elements of a transmission pump, the input shaft for which is a sleeve shaft 22 extending through the stator shaft 16.

A brake drum 24 is connected to brake drum hub 26 journalled on stationary sleeve shaft 18.

Located in the drum 24 is a clutch cylinder 28 which encloses an annular clutch piston 30. The cylinder 28 and the piston 30 define a pressure cavity which, when pressurized, urges the piston 30 to a clutch engaging position, which permits transfer of torque from shaft 12 to member 26. The drum 24 is surrounded by a friction brake band 32 which, when activated, anchors the drum 24, thereby holding member 26 stationary.

The over-running coupling of the invention is generally designated by reference character 34. It includes a first planar clutch plate 36, which is splined to member 26, and a second planar clutch plate 38, which is provided with external splines 40.

Internally splined brake disks 42 are drivably engaged with splines 40. They are arranged in inter-digital relationship with respect to externally splined separator plates 44, which are engaged with and held by internal splines formed in the surrounding portion of the housing 10.

The housing 10 and the stationary plate 14 define an annular cylinder 46 within which is situated annular piston 48. Compression springs 50 are seated on spring seat 52 and normally urge the piston 48 away from the friction disks 42.

Figure 3:
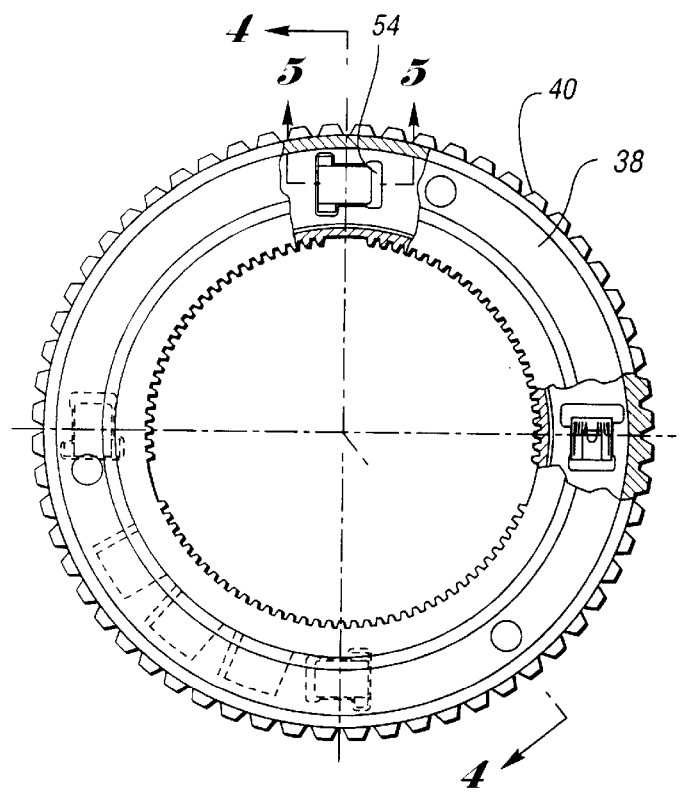
FIG. 3 is a plan view of the clutch assembly shown in FIG. 2.
Figure 4:
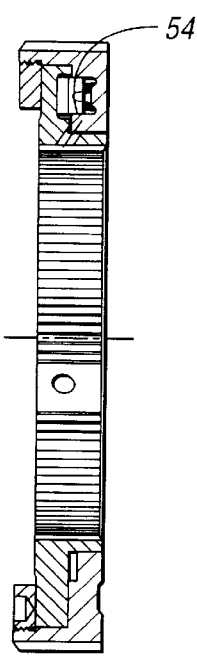
FIG. 4 is a cross-sectional view of the clutch sembly of FIG. 3 as seen from the plane of section line 4—4 of FIG. 3.

As seen in FIGS. 2, 3 and 4, the planar clutch plate 38 comprises a series of angularly spaced recesses 54, each of which receives a tiltable strut 56. Each strut is secured at one margin thereof on a shoulder 58 formed in the planar clutch plate 38.

Figure 5:
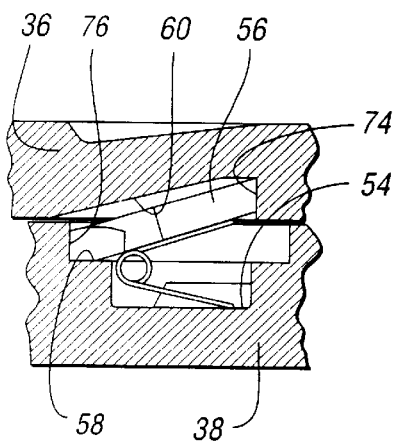
FIG. 5 is an enlargement of the portion of the clutch structure shown in FIG. 3 as seen from the plane of section line 5—5 of FIG. 3.

As seen in FIG. 5, clutch plate 36 is provided with recesses 60, which are adapted to receive the struts 56 upon pivotal movement of the struts 56 about the edge that engages the shoulder 58. The recesses 60 are arranged at the same radial position relative to the axis as the recesses 54 in the plate 38. The juxtaposed surfaces of the plates 38 and 36 are in close proximity when the clutch is assembled, as shown in FIG. 5.

As seen in FIG. 3, there are four recesses 54 in the plate 38. They are positioned around the axis of the clutch at 45 degree intervals.

Figure 6:
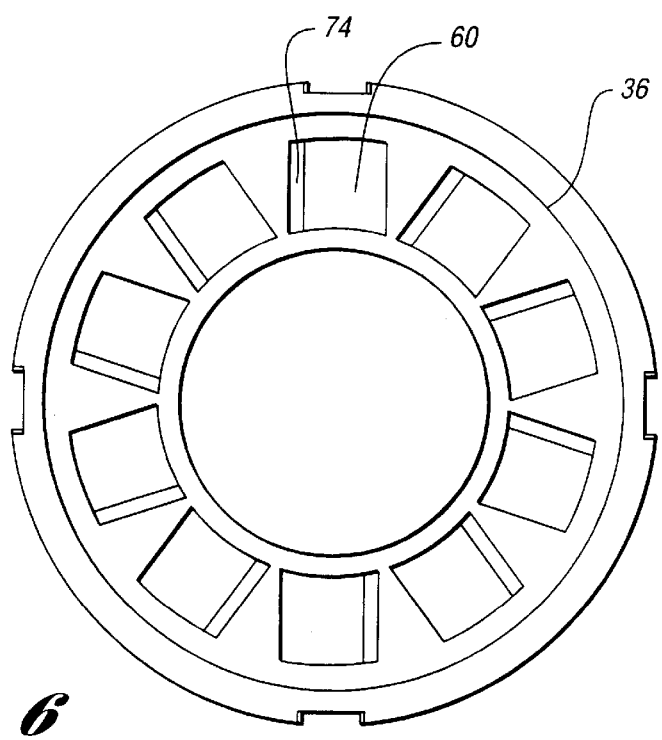
FIG. 6 is a plan view of the driven clutch plate illustrated in the assembly views of FIGS. 1–5.

There are ten recesses 60 formed in the plate 36, as seen in FIG. 6. The number of recesses 60 and 54 could be different than the number illustrated. For example, the embodiment shown in FIG. 6 has 10 recesses or pockets 60 in plate 36 and they are evenly spaced. Thus, one recess 60 will be located 180° from another. The plate 38 in FIG. 3 has at least two (e.g., four) recesses which are evenly spaced. Thus, one recess 54 will be located 180° from another. This configuration of the recesses will ensure that at least two struts may be active at any given time.

A predetermined amount of relative displacement of the plates may occur before the recesses 60 and 54 will establish full registry which will allow tilting motion of the struts into engagement with the recesses of an adjacent coupling plate. An increased number of recesses in the plates will decrease the extent of such relative displacement. This increases the so-called resolution of the coupling. The resolution that would be used for a particular application will depend upon the design specification. A coupling used in a stator assembly for a hydrokinetic torque converter, for example, would have design specifications that would differ from the specifications for a chain drive sprocket.

If the plate 38 has four recesses and the plate 36 has ten, two struts may engage simultaneously. If the plate 38 has four recesses and the plate 36 has twelve, four simultaneous strut engagements are possible. If plate 38 has five recesses and the plate 36 has fifteen, five simultaneous strut engagements are possible. The torque transmitting capacity increases as the number of strut engagements increases.

Reference may be made to the co-pending patent application, previously identified, for the purpose of obtaining a more particular description of a clutch plate design with straight-edge struts that engage the recesses as torque is transferred from one clutch plate to the other.

When the plate 38 rotates in the clockwise direction as viewed in FIG. 3, the clutch is capable of establishing a lock-up driving connection between the clutch plates as the struts enter the recesses 60. If the plates are rotated in their opposite relative direction as viewed in FIG. 3, the struts 56 are removed from the recesses 60, thereby permitting freewheeling relative motion.

In FIG. 7a, we have shown a plan view of a strut 56. The right margin of the strut 56 as seen in FIG. 7a is formed with an arcuate shape as seen at 62. The left margin of the strut illustrated in FIG. 7a has a pair of ears 64 and 66 formed integrally with the strut. These extend into pockets formed in the recess 54 in the clutch plate 38. The ears are formed, as shown in FIG. 7a, so that they are aligned with the left margin 68 of the strut 56. That left margin engages the shoulder 58 formed in the recess 54 as explained previously.

As seen in FIG. 7b, the strut 56 is provided with right and left parallel edges 70 and 72. The edge 70, when it is tilted into the recess 60, will conform to the shape of the shoulder 74 in the recess 60 so that thrust forces in the strut will be distributed over substantially the entire surface of the strut tip.

The left edge 72 of the strut 56 is formed in a plane that is parallel to the plane of edge 70, thereby permitting substantially full engagement of the entire area of the edge 72 over the surface of the left edge 76 of the recess 54.

The geometry of the leading and trailing parallel edges of the strut 56 avoids line contact and high stresses when the strut is transferring loads from the driving clutch plate to the driven clutch plate.

The ears 64 and 66 are provided with a taper as seen at 78. This avoids interference between the strut 56 and the adjacent surface of the clutch plate 36 as the strut 56 is tilted into the recess 60.

The recess 60, at its right hand margin 80, as seen in FIG. 7c, is rounded so that it generally conforms to the shape of the edge 62 of the strut 56. The radius of curvature of the edge 80 is equal to or slightly greater than the radius of curvature of the edge 62 of the strut 56. This strut and recess geometry, together with the inherent compressibility and elasticity of the materials, increases the bearing area and reduces unit compressive stresses.

FIGS. 8a–8c show a strut design corresponding respectively to the design of FIGS. 7a–7c. It includes a straight locking face 82.

Shown in FIGS. 9a–9c is a modified strut design corresponding respectively to the design of FIGS. 9a–9c. It includes a straight right-hand edge 86 which is rounded as shown at 88. Similarly, the left edge of the strut 90 is rounded as shown at 92.

The strut shown in FIGS. 9a, 9b and 9c may be formed from drawn wire stock, which then may be cut with simple punching operations into segments of predetermined width. This substantially reduces the cost of manufacturing the struts and eliminates finish machining. The rounded right and left edges of the strut 90 are received in corresponding rounded shoulder 94 and a rounded shoulder 96 formed respectively in the driving plate 38' and in the driven plate 36'.

The rounded edges of the struts and the rounded corners of the recess shoulders 96 reduce unit compressive stresses and increase tool life during manufacturing when the recesses are formed using metal forming dies.

Figure 10A:
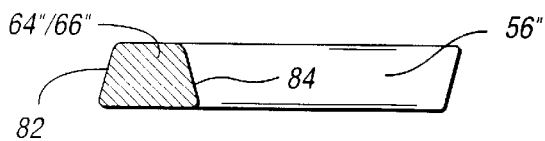
FIGS. 10a, 10b and 10c show an alternate strut and design wherein the strut ears and the pocket plate have angles that lock the strut in place.
Figure 10B:
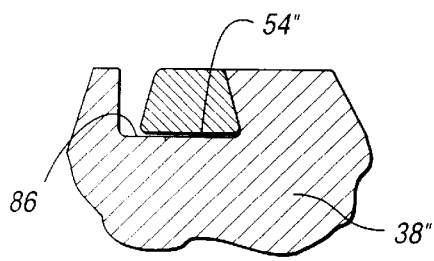
Figure 10C:
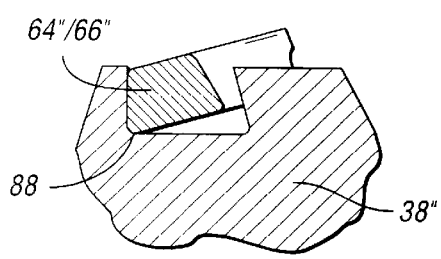

In FIGS. 10a–10c, show a modified strut ear design as shown at 64"/66". The strut itself is identified by reference numeral 56".

The ears 64"/66" have angled edges 82 and 84. Each ear is received in an ear recess 86, as seen in FIG. 10b, which forms a part of the pocket 54" formed in the clutch plate 38".

FIG. 10b shows a strut ear engaged with a cooperating ear pocket. In the position shown in FIG. 10b, the strut 56' would be received in the pocket in the plate 38". This is the over-running mode for the clutch. The relative motion of the clutch plate, by reason of the hydrodynamic drag of the lubricant, will cause the ears 64"/66" to shift into the position shown in FIG. 10b. When it is in that position, the angled surface 84 will engage a registering angled surface of the plate 38", thereby locking the strut 56" in place and holding it down out of engagement with the clutch pocket plate.

When the clutch is operating in the lock-up mode, as seen in FIG. 10c, the ears 64"/66" move to the left in the ear pocket 86, thereby removing the constraint provided by the angled surface 84 and the cooperating angled surface of the plate 38. The strut 56" is free to pivot, as shown in FIG. 10c, so that it will engage the plate 36'''. The edge 88 on the ears 64"/66" acts as a pivot point as the strut 56" pivots into clutching engagement.

Figure 11A:
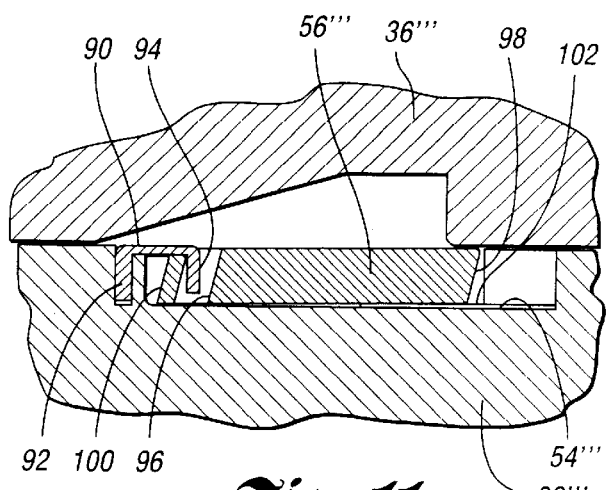
FIGS. 11a, 11b and 11c show an alternate strut and pocket plate design wherein a retainer clip is used to retain each strut and its registering plate pocket.
Figure 11B:
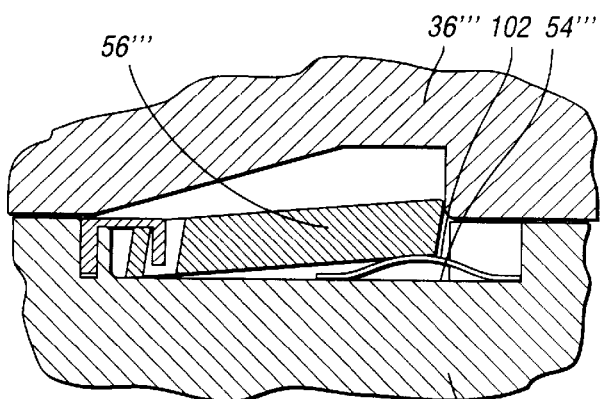
Figure 12:
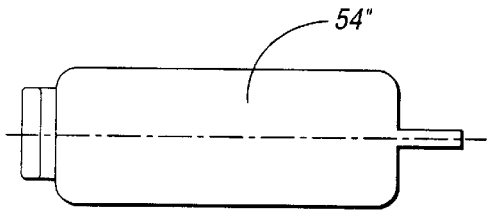
FIG. 12 is a detailed view of the pocket used in the embodiment of FIGS. 11a, 11b and 11c.
Figure 13:
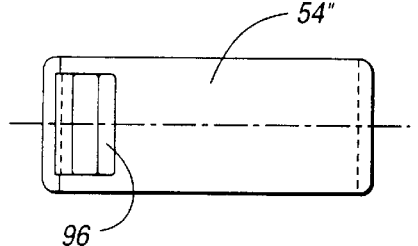
FIG. 13 is a detailed view of the strut that is used in the embodiment of FIGS. 11a, 11b and 11c.
Figure 11C:
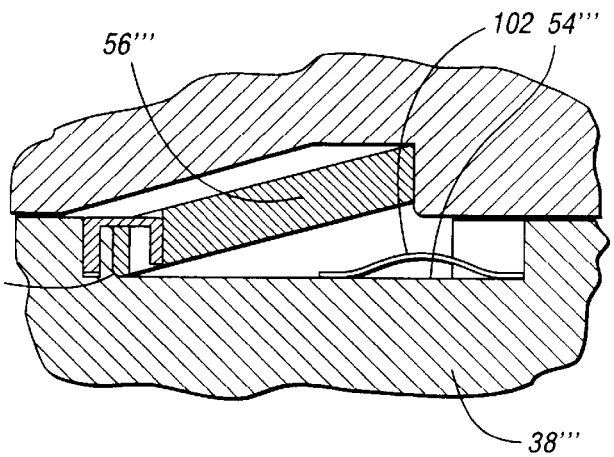

In the embodiment of Figures 11a, 11b and 11c, a strut 56''' is received in the strut pocket 54'''. A retaining clip 90, as seen in FIG. 11a, is formed with a generally U-shape and has one leg 92 received in a recess formed in the clutch plate 38'''. The other leg 94 of the retaining clip 90 is received in a slot 96 formed in one edge of the strut 56'''. The geometry of the strut 56''' is generally similar to the geometry illustrated in FIG. 7b where the strut has angled and parallel forward and leading edges 98 and 100.

A wave spring is seated on the base of the pocket 54'''and engages the strut 56''', urging it upwardly toward engagement with the pocket plate of the clutch, as seen at 36'''.

The retaining clip of the embodiment shown in FIGS. 11a, 11b and 11c will prevent lifting movement of the struts during over-running motion. At an instant just prior to clutch engagement, the spring 102 will lift the angled forward edge of the struts 56''', as indicated in FIG. 11b. When the strut 56''' is in a fully locked position in the pockets of the pocket plate, it pivots fully to the position shown in FIG. 11c, the left corner of the strut 56''' acting as a pivot point as shown at 104 in FIG. 11c.

The foregoing description of preferred embodiments is intended to include modification of the invention that would be apparent to persons skilled in the art. Such modifications and all equivalents are within the scope of the appended claims.

Having described preferred embodiments of the invention, what is claimed and desired to be secured by U.S. Letters Patent is:

1. A planar overrunning coupling having a driving coupling plate and a driven coupling plate on a common axis, said plates being connected, respectively, to a rotary torque input member and to a rotary torque output member, each plate having coupling face, said coupling faces being in close juxtaposed relationship, one with respect to the other, each coupling face being in a plane that is perpendicular to the common axis;

strut recesses in each of said coupling faces at locations spaced angularly about said axis at generally equidistant radial locations relative to the axis;

force transmitting planar struts, a first edge of each strut being received in and pivotally engageable with a strut recess in one coupling plate and a second edge of each strut being engageable with a recess in the other coupling plate;

said second edge of each strut having a first curvature and the strut recesses in said other coupling plate having a wall with a second curvature. The radius of the second curvature being equal to or greater than the radius of the first curvature of said strut edges whereby loads transferred through said struts are distributed over a load bearing surface to reduce stress during transfer of torque from said torque input member to said torque output member.

2. The coupling as set forth in claim 1 wherein each strut has a pair of ear elements on said one edge thereof, and ear pockets in the strut recess of the one coupling plate receiving said strut ear elements, whereby said struts are secured in their respective recesses in the one plate as they pivot about the first edges into registry with strut recesses in the other plate.

3. A planar overrunning coupling having a driving coupling plate and a driven coupling plate on a common axis, said plates being connected, respectively, to a rotary torque input member and to a rotary torque output member, each plate having a coupling face, said coupling face being in close juxtaposed relationship, one with respect to the other, each coupling face being in a plane that is perpendicular to the common axis;

strut recesses in said coupling faces at locations spaced angularly about said axis generally at equidistant radial locations relative to said axis;

force transmitting planar struts, a first edge of each strut being received in and pivotally engageable with a strut recess in one coupling plate and a second edge of each strut being engageable with a recess in the other coupling plate;

said struts being formed with rounded edges at their second edges; and the edges of said recesses in said other coupling plate being formed with strut engaging shoulders, said strut engaging shoulders being rounded with a radius of curvature substantially equal to the radius of curvature of the second rounded edges on said struts.

4. The coupling as set forth in claim 3 wherein each strut has a pair of ear elements on said one edge thereof, and ear pockets in the strut recess of the one coupling plate receiving said strut ear elements, whereby said struts are secured in their respective recesses in the one plate as they pivot about the first edges into registry with strut recesses in the other plate.

5. A planar overrunning coupling having a driving plate and a driven plate on a common axis, said plates being connected, respectively, to a rotary torque input member and to a rotary torque output member, each plate having a coupling face;

strut recesses in said coupling faces at locations spaced angularly about said axis at equidistant radial locations relative to said axis;

force transmitting struts, one edge of each strut pivotally engaging one edge of a strut recess in one coupling plate and another edge engageable with a recess in the other coupling plate;

each strut having strut ears at said one edge, said one coupling plate having ear pockets receiving said ears, said pockets having at least one wall thereof formed with an ear locking angle, said ears having one surface thereon formed with an angularity that registers with said one wall whereby said struts are locked in position as said ears prevent lifting of said struts away from said one coupling plate when one coupling plate overruns the other.

6. The overrunning coupling as set forth in claim 5 wherein said strut recesses in said other coupling face are angularly spaced about said axis whereby at least two strut recesses thereof are positioned at substantially the same angular location with respect to said axis as the angular position of said strut recesses in said one coupling plate whereby at least two struts are engageable simultaneously with their respective recesses in said other coupling plate to effect increased torque transfer capability.

7. A planar overrunning coupling having a driving plate and a driven plate on a common axis, said plates being connected, respectively, to a rotary torque input member and to a rotary torque output member, each plate having a coupling face;

strut recesses in said coupling faces at locations spaced angularly about said axis at equidistant radial locations relative to said axis;

force transmitting struts, one edge of each strut pivotally engaging one edge of a strut recess in one coupling plate and another edge engageable with the other coupling plate;

a retainer clip at said one edge of each strut, said clip having one portion thereof secured to said one coupling plate;

said struts having apertures at said one edge thereof, said apertures receiving another portion of said clips whereby said struts pivot about said one edge thereof while said clips retain said struts in place in their respective recesses.

* * * * *